US012144360B2

(12) United States Patent
Gorin et al.

(10) Patent No.: US 12,144,360 B2
(45) Date of Patent: Nov. 19, 2024

(54) RECIRCULATION INFUSING

(71) Applicants: Dmitry Gorin, San Francisco, CA (US); Michael Erwin, San Francisco, CA (US); Zinovy Dolgonosov, San Francisco, CA (US); Dan Yue, San Francisco, CA (US); Joey Roth, San Francisco, CA (US)

(72) Inventors: Dmitry Gorin, San Francisco, CA (US); Michael Erwin, San Francisco, CA (US); Zinovy Dolgonosov, San Francisco, CA (US); Dan Yue, San Francisco, CA (US); Joey Roth, San Francisco, CA (US)

(73) Assignee: Joey Roth Audio, LLC, Portland, OR (US)

( * ) Notice: Subject to any disclaimer, the term of this patent is extended or adjusted under 35 U.S.C. 154(b) by 434 days.

(21) Appl. No.: 16/870,684

(22) Filed: May 8, 2020

(65) Prior Publication Data
US 2021/0076699 A1    Mar. 18, 2021

Related U.S. Application Data

(60) Provisional application No. 62/900,285, filed on Sep. 13, 2019.

(51) Int. Cl.
*A23F 5/26* (2006.01)
*A23F 3/18* (2006.01)
(Continued)

(52) U.S. Cl.
CPC ............... *A23F 5/262* (2013.01); *A23F 3/18* (2013.01); *A47J 31/002* (2013.01); *A47J 31/005* (2013.01);
(Continued)

(58) Field of Classification Search
CPC ....... A23F 5/262; A47J 31/002; A47J 31/005; A47J 31/057; A47J 31/4403; A47J 31/4482; A47J 31/468
See application file for complete search history.

(56) References Cited

U.S. PATENT DOCUMENTS

| 4,109,565 A | * | 8/1978 | Tucker | A47J 31/053 |
| | | | | 99/310 |
| 2002/0164410 A1 | * | 11/2002 | Ogden | A23F 5/262 |
| | | | | 426/506 |

(Continued)

FOREIGN PATENT DOCUMENTS

WO    WO2018104886    *    6/2018

OTHER PUBLICATIONS

Cold-brew Made Easy: FREDDA, SparkAmpLab Editorial Team, https://www.sparkamplab.com/post/cold-brew-made-easy-fredda, Oct. 11, 2020, 7 pages.

(Continued)

*Primary Examiner* — Anthony J Weier
(74) *Attorney, Agent, or Firm* — Womble Bond Dickinson (US) LLP

(57) ABSTRACT

A recirculation brewing process and apparatus for performing the same are shown. In one embodiment, the coffee brewing process includes: a brew chamber to hold a packed chamber of coffee grounds; and a pump to force a liquid under pressure through the packed chamber of coffee grounds over multiple brewing cycles to extract coffee flavor from the coffee grounds into the liquid using a temperature agnostic infusing brewing process, the liquid under pressure causing a pressure differential over tunnels within the coffee grounds and over the brew chamber when forced through the chamber each cycle of a plurality of cycles to cause extraction of the flavor into the liquid.

18 Claims, 8 Drawing Sheets

(51) Int. Cl.
    *A47J 31/00*          (2006.01)
    *A47J 31/46*          (2006.01)
    *A47J 31/057*        (2006.01)
    *A47J 31/44*          (2006.01)

(52) U.S. Cl.
    CPC ............ *A47J 31/468* (2018.08); *A47J 31/057* (2013.01); *A47J 31/4403* (2013.01); *A47J 31/4482* (2013.01)

(56) References Cited

U.S. PATENT DOCUMENTS

| | | | | |
|---|---|---|---|---|
| 2015/0201796 A1* | 7/2015 | Kuempel | ................ | A47J 31/52 99/283 |
| 2019/0191913 A1* | 6/2019 | Richardson | ........... | A47J 31/005 |
| 2021/0076871 A1* | 3/2021 | Gorin | .................... | A47J 36/321 |

OTHER PUBLICATIONS

FrankOne™—Cold Brew and Coffee in Seconds, https://www.kickstarter.com/projects/edumana/frankone-the-first-one-touch-specialty-coffee-brew, Nov. 17, 2021, 31 pages.
Swift 10 Minute Cold Brew Device, https://nsnydesign.com/swift-cold-brew-coffee-device/, 10 pages.

* cited by examiner

RECIRCULATION INFUSING

RELATED APPLICATION

The present application is a continuation of and claims the benefit of U.S. Provisional Patent Application No. 62/900,285, filed on Sep. 13, 2019 and entitled "RECIRCULATION BREWING", and is incorporated by reference in its entirety.

FIELD OF THE INVENTION

Embodiments of the present invention are related to creating beverages by infusion; more particularly, embodiments of the present invention are related to creating beverages via infusion through the use of differential pressure.

BACKGROUND

People have been infusing liquids such as water and oils for years to add flavor from materials such as dried plant material to the liquid. One common type of infusion process is a brewing process that uses dried plant materials such as coffee and tea to create a beverage.

Brewing beverages such as coffee has been performed for generations. The goal of brewing processes has been to obtain the highest quality brew by infusing water with coffee flavor from coffee grinds. While the last few decades have seen substantially activity in new coffee brewing techniques, not one significant new brewing/infusing process has emerged.

Today, consumers want coffee that is rich in flavor. However, the process typically used to make coffee involves the use of heat. Using heat in the brewing process enables the coffee to be made quickly. However, when heat is required in the brewing process, there are some undesirable consequences. First, using heat as part of the brewing process causes the extraction undesirable compounds (e.g., acidity) from the coffee grounds. Second, the use of heat as part of the brewing process destroys aroma. It would be desirable to make coffee that is rich in flavor using a brewing process with the advantages of using heat so that coffee is made quickly, while avoiding the extraction of the undesirable compounds that result from the use of heat in the brewing process.

The "cold brewing" of coffee has also been practiced for many years. The typical process involves the soaking and or brewing, or infusing, of coffee with room temperature water in a vessel for a long period of time. The normal amount of time is usually 12 to 24 hours. This process is considered by many as a very good extraction method, but the process takes too much time for the typical consumer.

SUMMARY OF THE INVENTION

An infusing device and method for using the same are described. In one embodiment, the infusing device infuses flavor into a liquid. The infusing device may be used to create different beverages, such as, for example, but not limited to, coffee and tea.

A recirculation brewing process and apparatus for performing the same are disclosed. In one embodiment, the coffee brewing process comprises: a brew chamber to hold a packed chamber of coffee grounds; and a pump to force a liquid under pressure through the packed chamber of coffee grounds over multiple brewing cycles to extract coffee flavor from the coffee grounds into the liquid using a temperature agnostic infusing brewing process, the liquid under pressure causing a pressure differential over tunnels within the coffee grounds and over the brew chamber when forced through the chamber each cycle of a plurality of cycles to cause extraction of the flavor into the liquid.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
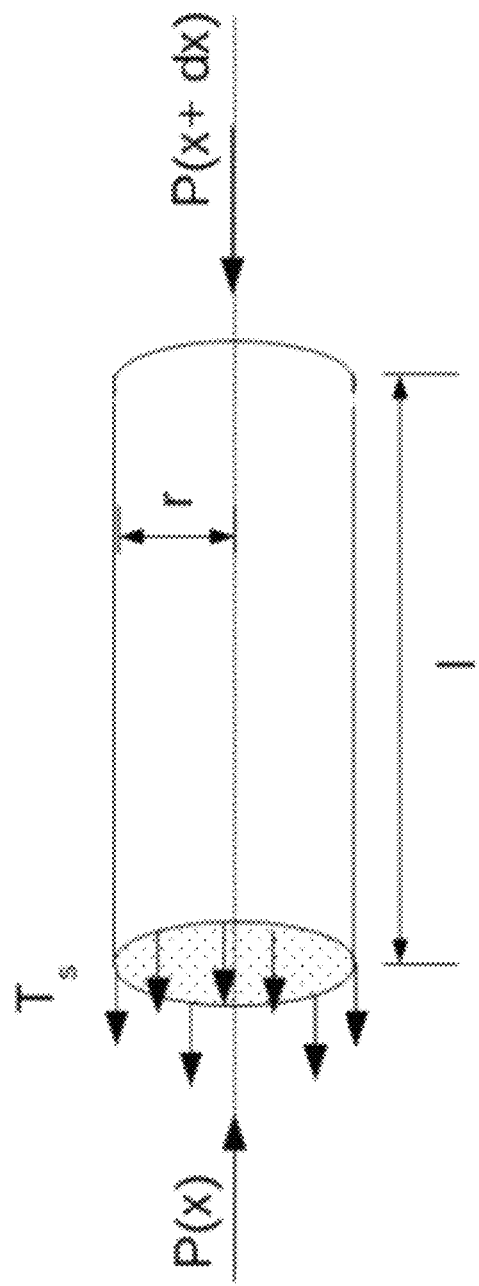
FIG. 1 is an exemplary illustration of a tunnel in an infusing material.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A method of transferring "flavor" (e.g., a mass of molecules that can be detected on an average person's tongue or consumable particles which have taste) via infusion from one solute to another and an apparatus for doing the same are described. The infusion process may be part of a process for brewing beverages. In one embodiment, the beverage is coffee or tea. However, the process is not limited to the making of coffee or tea, and may be used to with other infusion-compatible materials. For example, the process may be used to infuse other materials (e.g., lemon zest, one or more spices, one or more plant materials, non-plant-based materials (e.g., mineral, synthetic material, a mixture, a powder, creamer (e.g., dairy, non-dairy, etc.), dissolvable substances, etc.) into water, oil, alcohol, or some other liquid or solution.

In one embodiment, the infusion process is temperature agnostic and thus does not rely on temperature changes, particularly a temperature change that is made in a significant and intentional fashion for infusion. Therefore, the liquid may be at room or ambient temperature when the brewing process starts. In one embodiment, the liquid is very cold at the start of the brewing process. Using very cold water (e.g., less than 35° F.) at the start of the brew process often results in a more pleasant beverage when the process is used for brewing coffee.

Furthermore, in one embodiment, the infusion process relies on pressurization and a vacuum used in a repeated fashion with the intention to produce a transfer of flavor. In other words, while prior art techniques use heat or pressure or vacuum once, in one embodiment, the infusion process described herein does not change or use manipulation temperature (apart from an unintentional result of the process) and uses pressure changes repeatedly (i.e., a repeated use of pressure) to transfer flavor.

In one embodiment, the use of pressure comprises setting up a pressure differential across both a brewing chamber and across each tunnel (pore) in each piece of infusion material (e.g., across each piece of plant material (e.g., coffee ground, across each tea leaf, etc.)) and repeatedly applying the pressure differential to the infusion material. In one embodiment, the pressure differential is created by forcing the liquid (e.g., water) being infused through the tunnels (pores) in the material. These tunnels affect the movement of this liquid. In one embodiment, when the infusion material is within a pod that is placed into a brewing chamber, using the techniques disclosed herein a pressure differential is created across each tunnel in each piece of infusion material and across the pod from the inlet of the brew chamber to an outlet of the brew chamber.

In one embodiment, the infusion or brewing process described herein uses a portable device (e.g., a portable battery-operated device) to create a pressure differential in a vacuum to move a liquid through tunnels in infusion material in multiple cycles without the need for heat.

Note that in one embodiment, a change the temperature of the solution or other particles may be incorporated in the process of creating a beverage as part of post- or pre-brewing, but this would not be to intentionally cause a change in flavor at the time the change in temperature occurs. For example, after using a cold brew process disclosed herein, the resulting infused beverage may be heated to a temperature more desirable for drinking based on individual preference.

In one embodiment, heat is added to the brewing process to enhance flavor extraction. In one embodiment, heat is an adjustable parameter that is controlled during the brewing/infusing process to enhance flavor extraction.

Tunnels (Pores)

As discussed above, in one embodiment, the flavor extraction process uses a maze of hollow tunnels in the infusion material used for infusing a solution (e.g., water) by passing the solution through the tunnels using a pressure differential. In one embodiment, the solution is pushed through the infusion material. In another embodiment, the solution is pulled through the infusion material. More specifically, when the solution builds up enough pressure, it is able to enter into the tunnels and thus gather more of the flavor, which is carried out either by reversing the process (pressurize, and then vacuum). The pressure builds up until the solution finally makes it through the material, thereby carrying a large amount of flavor from the material.

In terms of a material such as coffee, when pushing through the tunnels in a granule of coffee, if the pressure from one side of the granule to the opposite side is larger enough to break the surface tension of the liquid, then flow through the interior occurs and allows the transfer of flavor. In this way, the process disclosed herein replaces heat as a major method of reducing surface tension. In one embodiment, the amount of pressure differential is only be a few PSI difference to cause the transfer of flavor. In one embodiment, the range of pressure is from 5 to 25 PSI. This can be shown with a simple mathematical model. The pressure differential from one side of a morsel of material (e.g., plant material like, for example, coffee ground, tea leaf, etc.) overcomes the surface tension of water and allows the water to penetrate, thereby extracting soluble solids (e.g., flavor, nutrient, etc.). Thus, the process obtains a pressure differential for use in infusing a solution with flavor.

In the case of brewing coffee, the coffee is brewed is an infusion process that uses a pressure differential for multiple cycles while being temperature agnostic. Example embodiments of a process and device for brewing coffee using the techniques disclosed herein are described in more detail below.

In one embodiment, the brewing device is designed to serve the output from the brewing chamber directly without dilution. An example of this is described in more detail below in conjunction with FIG. 6. In another embodiment, the output of the brewing chamber is diluted into a volume of water or a liquid containing the outputs of one or more previous brew cycles.

A number of brewing cycles were compared for coffee strength (TDS) where the brewing cycles differed as batch, continuous, duty cycle, and brew duration. In one embodiment, the brew duration is the length of time the liquid is forced through the infusion material. In one embodiment, this is the same as the amount of time a pump is on that forces the liquid through the infusion material. In one embodiment, a particular recipe may specify that the total amount of time the pump is going to be on over the entire brewing cycle is the brew duration. The duty cycle refers to the ratio of the amount of time that brewing is undergoing with the pump being on, and the pressure differential being applied, to the overall brew duration. In one embodiment, the length of the brew cycle is 30 seconds to a one minute. However, the length of brewing cycle may be shorter or longer than that amount of time. With all other parameters kept the same (weights of water and coffee grounds, temperature, pressure, coffee grind level), the coffee strength was remarkably consistent. For example, in one test of brewing coffee (medium grind Lavazza Classico coffee, 20 grams tamped, and 180 ml of water at room temperature), the brew had a TDS of 2.0-2.2 for 6-minute brews and 2.2-2.4 for 12-minute brews. By most standards, this is strong coffee.

Mathematical Model for Brewing

In the brewing process described herein, pressure of a solution to be infused (e.g., water pressure, etc.) provides a force to overcome the surface tension of the solution in order for solution to penetrate, flow through the tunnels in the infusing material (e.g., coffee grounds, etc.) and extract flavor. But pressure alone isn't enough, the embodiments described herein provide a pressure gradient or pressure differential from the input side of the infusing material to the output side. The pressure differential from one side of a morsel of infusing material (e.g., coffee ground, tea leaf, etc.) to the other side overcomes the surface tension of solution (e.g., water), thereby allowing the solution to penetrate via tunnels and extract extracting soluble solids (flavor, nutrient, etc.).

These tunnels or pores represent channels through the infusing material (e.g., coffee grain cells). FIG. 1 shows the forces acting on the water that flows through the tunnel, where the surface tension $T_s$ opposes the flow (little arrows) and pressure P points inward on both sides of the tunnel (longer arrows). If the pressure from the left is larger than the pressure from the right, which is required for flow to occur from left to right, then the resulting force is $$F_{pressure} = P(\text{left}) \times \text{area} - P(\text{right}) \times \text{area} = dP/dx \times \text{area} \times \text{length}$$

where dP/dx is the derivative or differential pressure, area is $\pi r^2$, and the length is the diameter of the ground (1 in FIG. 1, and r is the tunnel radius in FIG. 1). This resulting force has to exceed the force due to surface tension, $T_s$, which is $$F_{surface} = T_s \times \text{circumference of tunnel entrance.}$$

The circumference is $2\pi r$. Again, the pressure differential force must be larger than the force of surface tension to give the relation for further consideration, which becomes $$dP/dx > (2T_s)/(r1)$$

When brewing coffee, roasted and ground coffee beans have certain cellular properties that includes tunnels. The cells form tunnels when roasted and allow water to penetrate the coffee ground. For example, see www.coffeeiq.co/en/grinding-particle-size-and-extraction. Some coffee grounds have tunnels with diameters of 50-80 microns, while others have tunnels with diameters of 20-40 microns. Also, the coffee ground diameter depends on the grind, but typically around 600 microns for filter coffee and 300 microns for espresso coffee.

The surface tension of water as the solution is dependent on temperature. For example, for cold brew, the value of the surface tension is around 0.070 Nt/m or 70 mN/m.

The pressure differential may be calculated and compared. Using the brew process described herein, in one embodiment, the brewing chamber creates a pressure differential of 1.2 atm/cm for filter coffee and 2.3 atm/cm for espresso coffee. If the brewing chamber is 2.5 cm deep, the pressure differential would require 3 atm or 42 psi to brew with filter coffee and 5.8 atm or 80 psi for espresso grind. Thus, the size of the ground affects surface tension and the brew process. In one embodiment, pressure ranges from 5 to 25 PSI are used for the brewing process.

Thus, while the numbers presented above are estimates, it is important to note the relationships that water or other liquid to be infused is allowed to penetrate coffee grounds and extract flavor. Heat is not necessary and reasonable pressures can compensate for lower temperature to get the same extraction.

Another factor that influences the amount of extraction besides size of the material (e.g., ground size) and volume is the temperature of the solution at the start of the brew cycle. In one embodiment, super cold water (or other solution) made for an improved coffee flavor. In one embodiment, the brewing process is started with water having a temperature less than the typical room temperature (e.g., less than 35° F.) and the resulting coffee is considered by some to be appreciably better.

In one embodiment, the brewing process is performed using a portable brewing device. In one embodiment, the portable brewing device infuses a liquid with flavor from an infusing material (e.g., plant material such as, for example, but not limited to, coffee grounds, tea leaves, etc.) using: a liquid container to store a liquid; a brew chamber to hold the infusing material (e.g., plant material (e.g., coffee grounds, tea leaves, spices, etc.); and a pump to generate a pressure differential over tunnels within the infusing material and over the brew chamber by forcing the liquid through the chamber each cycle of a plurality of cycles to cause extraction of the flavor into the liquid. In one embodiment, the extraction is performed without the need for heat.

In one embodiment, the portable brewing device includes portable power source (e.g., a rechargeable battery) (not shown to avoid obscuring the present invention) coupled to provide power to components of the portable brewing device, such as, for example, the pump, controller, communication interfaces, sensors, etc.

In one embodiment, the liquid comprises water. In one embodiment, the infusion material comprises plant material. In one embodiment, the plant material starts as dried plant material, but as subsequent brewing cycles are performed, the plant material is wet as a result of the liquid being forced over the plant material. In one embodiment, the dried plant material comprises coffee. In another embodiment, the dried plant material comprises tea leaves.

In one embodiment, the portable brewing device comprises a heater to heat the liquid in the chamber. In one embodiment, the heating is performed after the brewing process in order to adjust the temperature of the infused liquid. The adjustment may be made to bring temperature of the infused liquid to a temperature more suitable or desirable for consumption. In such a case, the heating for this purpose is not an agent of the brewing process. In another embodiment, the heating is performed to enhance the extraction caused by application of the pressure differential.

Figure 2:
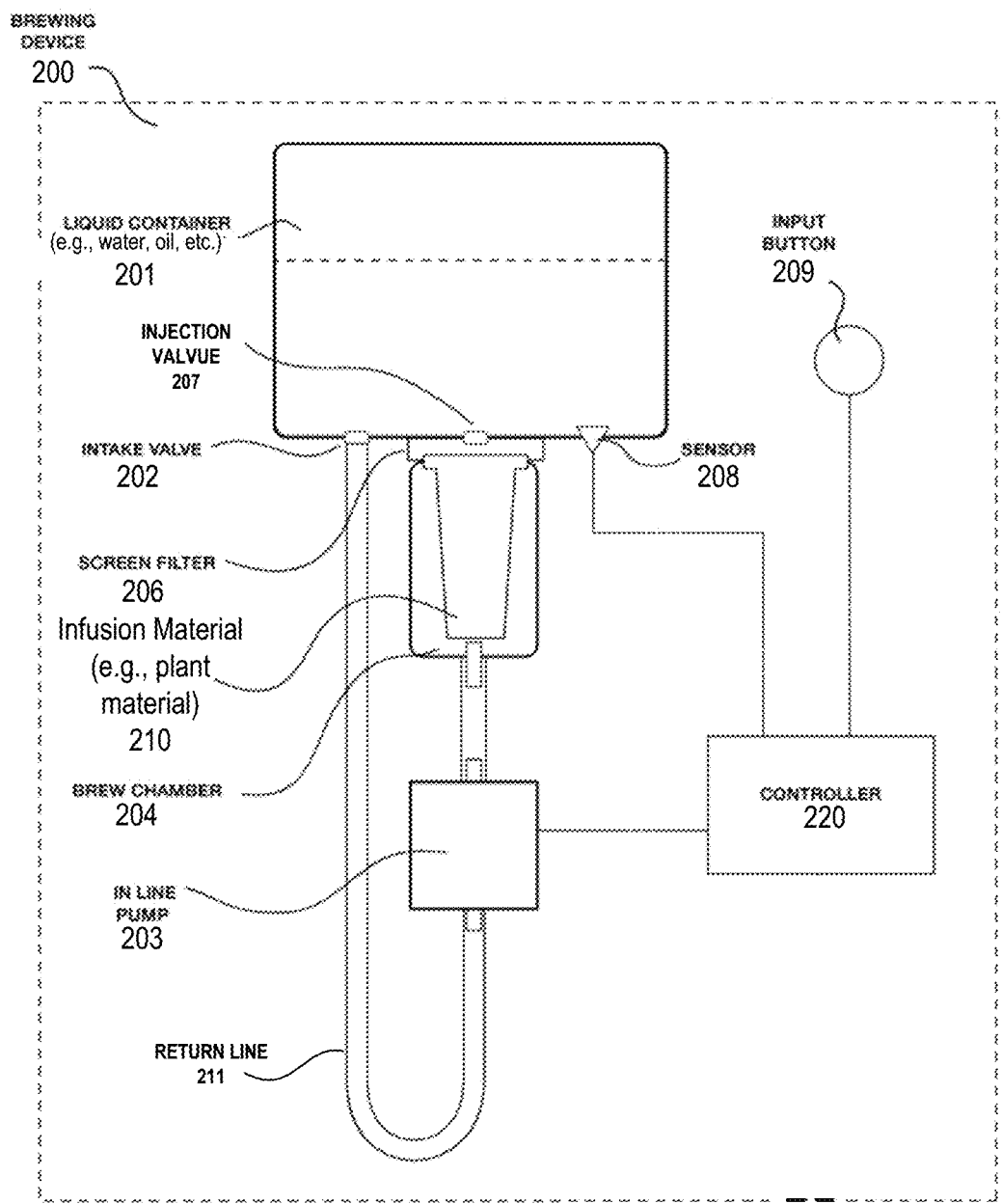
FIG. 2 is a block diagram of one embodiment of an infusing device.

FIG. 2 is a block diagram of a brewing device for infusing a liquid with a material (e.g., plant-based material, etc.). Referring to FIG. 2, brewing device 201 comprises a liquid container 201 that is initially filled with water or some other solution (e.g., oil, etc.). Liquid container 201 is coupled to brew chamber 204. In one embodiment, liquid container 201 is coupled to brew chamber 204 via injection valve 207. In one embodiment, a screen filter 206 is between liquid container 201 and brew chamber 204 to filter liquid coming from liquid container 201 prior to its entry into brew chamber 204. Screen filter 206 prevents infusing material 210 from expanding upwards as they bloom, maintaining the necessary constriction against the flow of water.

Infusing material 210 is placed or held in brew chamber 204. In one embodiment, infusing material 210 is contained within a pod or similar structure that is place and otherwise contained in brewing chamber 204. In one embodiment, infusing material 210 comprises plant material, such as, for example, but not limited to, coffee grinds, tea leaves, one or more spices, etc. In another embodiment, infusing material 201 comprises non-plant material.

In-line pump 203 is coupled to the end of brew chamber 204. In-line pump 203 forces the liquid from injection valve 207 into brew chamber 204 that contains infusing material 210, and in the process causes the pressure differential described above, which in turn causes the liquid to flow through tunnels in the infusing material. In one embodiment, the output of brew chamber 104 is sent through in-line pump 203 and through to an intake valve 202, via return line 211, into liquid container 201. Thus, the liquid is returned to liquid container 201 in an infused state. In one embodiment, a lid (not shown) on liquid container 201 allows a user to drink from liquid container 201. In another embodiment, another output path is able to receive the infused liquid to provide the results of the infusion process.

In one embodiment, a controller 220 is coupled to in-line pump 203 to control the brewing process, including controlling when in-line pump 203 is turned on and off as part of the infusing process. In one embodiment, when brewing device 200 starts a brew process to infuse a liquid, controller 220 starts in-line pump 203 and keeps it running for a predetermined amount of time. In one embodiment, controller 220 determines this amount of time. The determination may be based on the type of brew/infusion being performed, user input from a user of the device, and/or sensor information (e.g., temperature from sensor 208). In-line pump 203 sucks liquid from liquid chamber 201 through injection valve 207, and liquid from liquid chamber 201 is pumped by in-line pump 203 into and through brew chamber 204. In-line pump 203 generates a pressure differential across brew chamber 204 and forces water through infusing material 210 in brew chamber 204. This causes a cold brew effect to occur. In one embodiment, in-line pump 203 has 7 bar pump pressure to pressurize the liquid from liquid container 201 to cause the liquid to move under pressure to and through brewing chamber 204. That is, in-line pump 203 causes a pressure differential from the top of brewing chamber 204 to the bottom of brewing chamber 204 as well as over each morsel of infusing material. Infused liquid passes from brew chamber 204 through intake valve 202 and back into liquid container 201, via return line 211, where it mixes with the rest of the water in liquid container 201.

In one embodiment, the brew cycle is repeated multiple times, and each time in-line pump 203 forces liquid from liquid container 201 through infusing material 210 in brew chamber 204 for as long as in-line pump 203 is running. Each cycle results in the liquid being infused further by infusing material 210. This cycling process may continue until a desired brew is achieved.

An input button 209 is also coupled to controller 220 to signal a start and/or stop to the brewing process being performed by brewing device 200 under control of controller 220. Thus, brewing device 200 starts when input button 209 is pressed.

In one embodiment, brewing device 201 includes a temperature sensor 208 that monitors the temperature of the liquid in liquid container 201 and provides the temperature data to controller 220. This is optional and in one embodiment is used to enhance the extraction of flavor from the infusing material 210. In one embodiment, sensor 208 senses temperature and provides it to controller 220, which then scales the run time for in-line pump 203 (e.g., scales the brew cycle) based on sensed water temperature.

Figure 3:
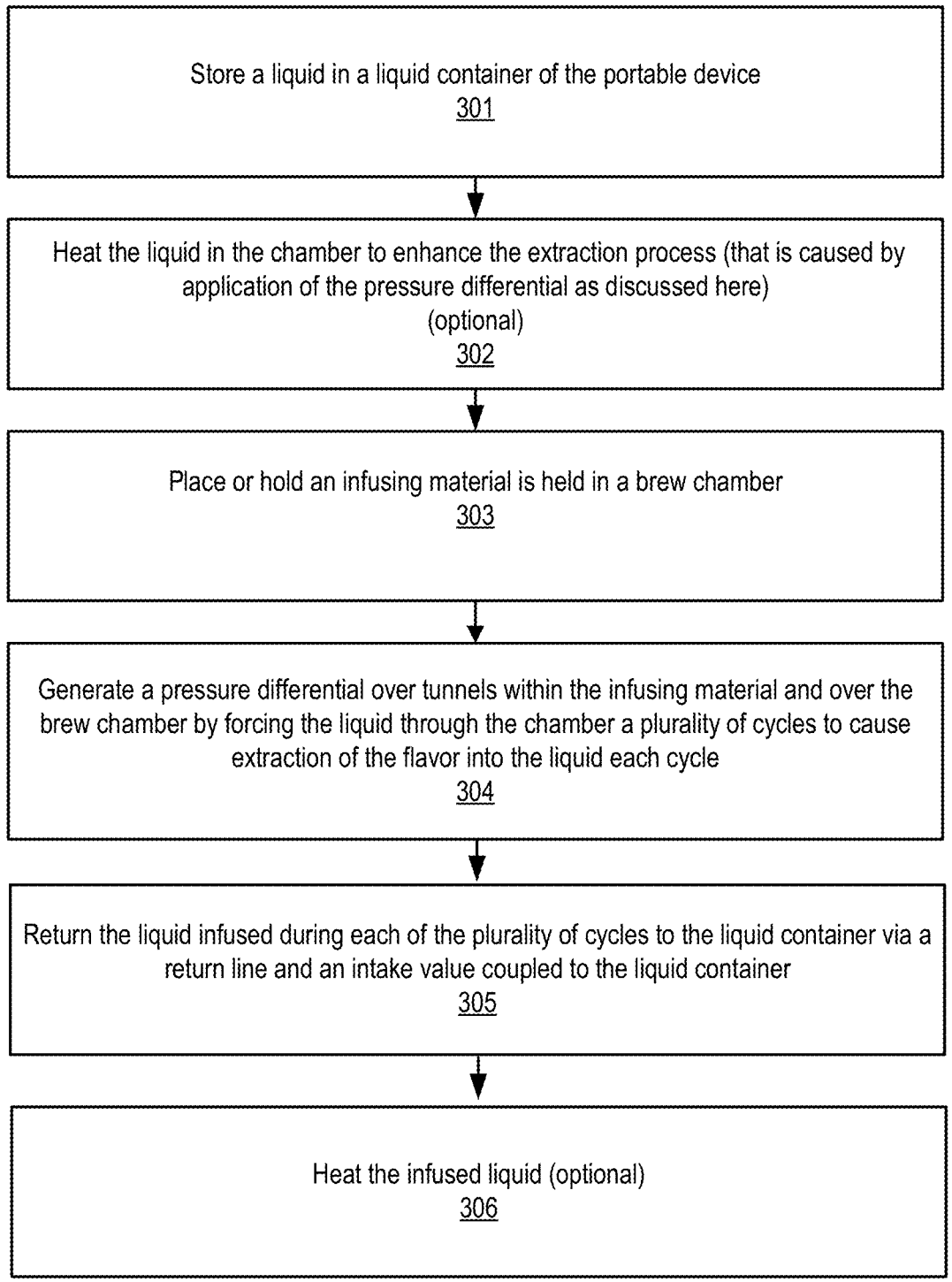
FIG. 3 is a flow diagram of one embodiment of an infusing process.

FIG. 3 is a flow diagram of one embodiment of a brewing process for infusing a liquid with flavor from material using a portable device. In one embodiment, the process is by a brewing device, such as, for example, but not limited to, the brewing device of FIG. 2.

Referring to FIG. 3, the process begins by storing a liquid in a liquid container of the portable device (processing block 301). In one embodiment, the liquid comprises water. Alternatively, the liquid comprises an oil, alcohol, or any drinkable liquid.]

In one embodiment, the process includes heating the liquid in the liquid container to enhance the extraction process (that is caused by application of the pressure differential as discussed here) (processing block 302).

An infusing material is held in a brew chamber (processing block 303). In one embodiment, the infusing material comprises plant material. In one embodiment, the plant material comprises coffee. In one embodiment, the plant material comprises tea leaves.

With liquid in the liquid container and infusing material in the brew chamber, a pressure differential is generated over tunnels within the infusing material and over the brew chamber by forcing the liquid through the chamber a plurality of cycles to cause extraction of the flavor into the liquid each cycle (processing block 304). In one embodiment, the pressure differential is created in part using a pump that forces the liquid through the chamber. In one embodiment, the pump pulls the liquid through the brew chamber to cause extraction of the flavor into the liquid each cycle. In another embodiment, the pump pushes liquid through the brew chamber to cause extraction of the flavor into the liquid each cycle. In one embodiment, the process includes powering the pump using a portable power source (e.g., a rechargeable battery). In one embodiment, the extraction is performed without the need for heat. In one embodiment, the extraction occurs in a vacuum.

In one embodiment, the process includes returning the liquid infused during each of the plurality of cycles to the liquid container via a return line and an intake valve coupled to the liquid container (processing block 305). In one embodiment, the pump is in line between the brew chamber and the return line.

At the point that the brew process has finished, in one embodiment, the infused liquid may be heated (processing block 306). In one embodiment, this heating occurs to bring the infused liquid to a desired, preferred, or better drinking temperature. In one embodiment, temperature is raised to 60° C. or a temperature near that temperature.

The remainder of the description will focus on one process for brewing of coffee. However, one skilled in the art would recognize that tea or other infusion-compatible materials could be substituted for coffee in the description below.

An Example of a Coffee Brewing Process

In one embodiment, the brewing device brews coffee by forcing a liquid (e.g., water, coffee infused water) under pressure through a tightly packed chamber of coffee grounds to cause extraction. The kinetic energy of the liquid moving under pressure through tunnels in each coffee ground causes the infusion of the liquid with coffee. That is, the liquid that is to be infused and moving under pressure causes pressure and experiences a pressure gradient across the tightly packed coffee grounds (i.e., the pressure builds up within the mass of the coffee grounds), which results in the infusion of the liquid with coffee. In this manner, the coffee brew results from an interaction between pressure energized water and packed coffee grounds.

In one embodiment, the brewing process obtains additional infusion through the use of recirculation in which the brewing process is repeated with coffee-infused water as an input. The recirculation results from performing one or more additional brewing cycles, where each brewing cycle involves turning on a pump to enable liquid to enter the brewing chamber. The brewing cycles may be performed a number of times based on the desired infusion. In one embodiment, the brewing cycle may be performed 3 or 4 times, but is not limited to this number. For example, in the case of brewing tea, many more brewing cycles may be performed.

Figure 4:
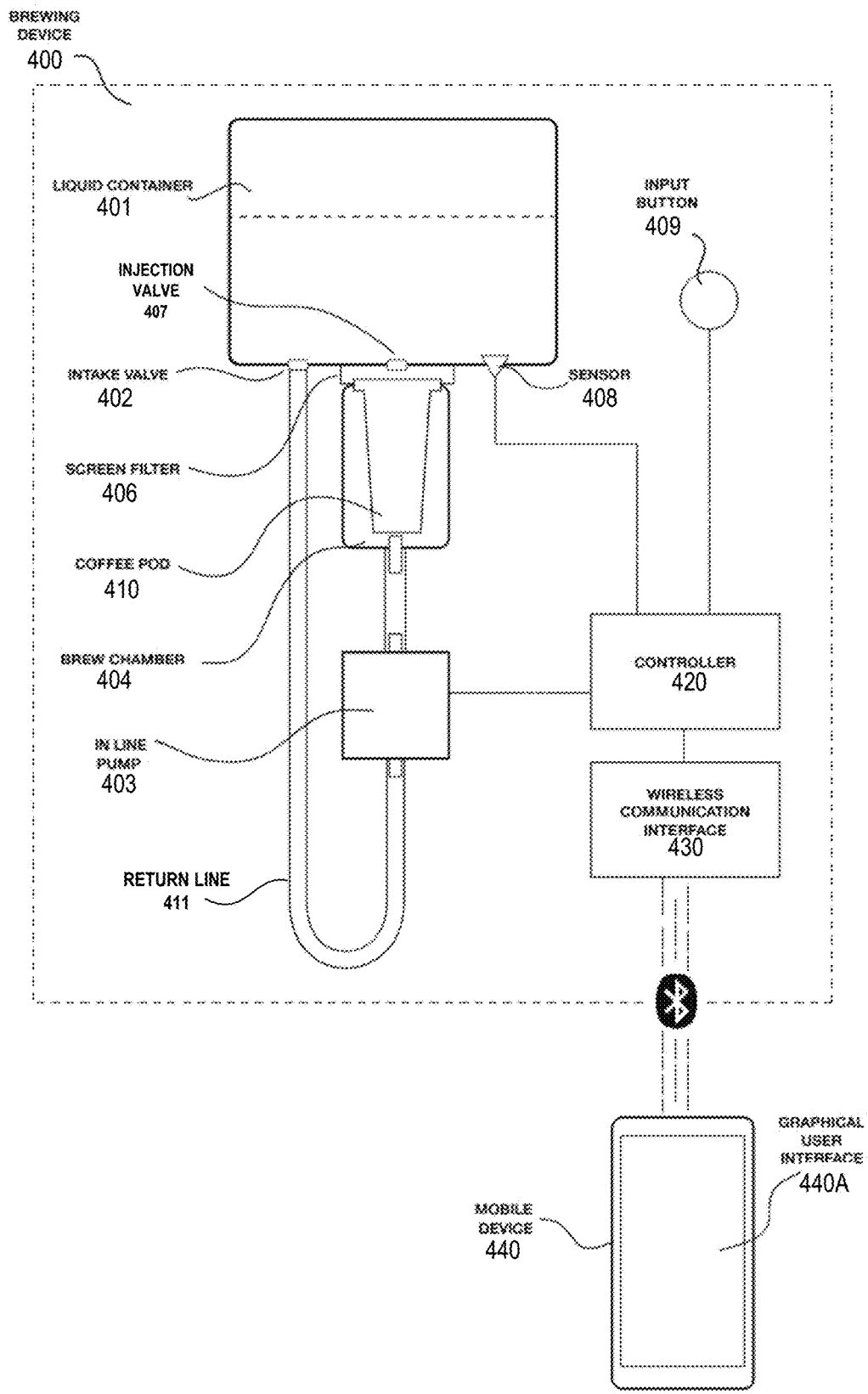
FIG. 4 is a block diagram of another embodiment of an infusing device.

FIG. 4 is a block diagram of a brewing device that is used to perform multiple brewing cycles to create a beverage. Referring to FIG. 4, brewing device 401 comprises a liquid container 401 that is initially filled with water, an injection valve 402 that feeds liquid from liquid container 401 to a brew chamber 404, and an in-line pump 403 that causes liquid from injection valve 402 to proceed through screen filter 406 and and through brew chamber 404 that contains coffee pod 410. The output of brew chamber 104 goes through in-line pump 403 and back into liquid container 401 via return line 411 and intake valve 402. Thus, the brewed coffee is returned to liquid container 201. In one embodiment, a lid (not shown) on liquid container 401 allows a user to drink coffee from liquid container 401.

More specifically, in-line pump 403 generates a pressure differential across brew chamber 404 and forces water through coffee grounds in coffee pod 410 in brew chamber 404. This causes a cold brew effect to occur. In one embodiment, in-line pump 403 has 7 bar pump pressure to pressurize the liquid from liquid container 401 to cause the liquid to move under pressure to and through brewing chamber 404. That is, in-line pump 403 causes a pressure differential from the top of brewing chamber 404 to the bottom of brew chamber 404 as well as over each coffee ground. Coffee-infused water passes from brew chamber 404 through intake valve 402 and back into liquid container 401, via return line 411, where it mixes with the rest of the water in liquid container 401.

In one embodiment, the brew cycle is repeated multiple times, and each time in-line pump 403 forces liquid from liquid container 401 through coffee grounds in coffee pod 410 in brew chamber 404 for as long as in-line pump 403 is running. Each cycle results in the liquid being infused further by the coffee grounds in coffee pod 210. This cycling process may continue until a desired brew is achieved.

An input button 409 is also coupled to controller 420 to signal a start and/or stop to the brewing process being performed by brewing device 400 under control of controller 420. Thus, brewing device 400 starts when input button 409 is pressed.

In one embodiment, brewing device 401 includes a temperature sensor 408 that monitors the temperature of the liquid in liquid container 401 and provides the temperature data to controller 420. This is optional and in one embodiment is used to enhance the extraction of flavor from the coffee grounds in coffee pod 410. In one embodiment, sensor 408 senses temperature and provides it to controller 320, which then scales the run time for in-line pump 403 (e.g., scales the brew cycle) based on sensed water temperature.

In one embodiment, brewing device 401 also includes a wireless communication interface 430 coupled to controller 420 to perform wireless communication with one or more other devices. In one embodiment, the wireless communication is short-range wireless communication (e.g., Bluetooth, infra-red, etc.), though the techniques described herein are not limited to using short-range wireless communication. In one embodiment, the device communicating with brewing device 401 is a mobile device, such as mobile device 402. Mobile device 402 may be a mobile phone (e.g., smartphone), tablet, laptop computer, personal digital assistant, Internet appliance, etc.

In one embodiment, the process performed by brewing device 401 to brew coffee is as follows.

First, a user pairs brewing device 401 with their personal mobile device (e.g., mobile device 440). In one embodiment, this pairing is done using short-range wireless communication (e.g., Bluetooth, infra-red, etc.) using wireless communication interface 440A and a wireless communication interface of mobile device 440.

Next, the user inserts coffee pod 410, which contains tightly packed coffee grounds, into brew chamber 404, adds water of any temperature to liquid container 401, and selects the correct brew cycle via a graphical user interface (GUI) of the mobile device (e.g., mobile device 440A).

In response to the user selection, the selected brew cycle is communicated to controller 420 via wireless communication interface 430. In one embodiment, this also wakes brewing device 401 from a reduced power consumption state (e.g., sleep mode, etc.). Then, the user presses input button 409 to start brew cycle.

In one embodiment, sensor 408 senses temperature and scales the run time for in-line pump 403 (the brew cycle) based on sensed temperature of the liquid in liquid container 401. This is optional.

At this point, in one embodiment, controller 420 starts in-line pump 403 and keeps it running for a predetermined amount of time. In one embodiment, controller 420 determines the amount of time based on programming that is used to achieve a particular coffee brew. In one embodiment, the time is also based on temperature information from sensor 408 and/or user input from mobile device 440. In-line pump 403 sucks water from liquid container 401 through injection valve 402, and into brew chamber 404. In-line pump 403 forces the liquid received from liquid container 401 through tightly tamped grounds in coffee pod 410. This causes a cold brew effect to occur. In one embodiment, in-line pump 403 has 7 bar pump pressure to pressurize the liquid from liquid container 401, thereby creating a pressure differential to cause the liquid to move under pressure through brewing chamber 404 and tunnels in the coffee grounds within coffee pod 410. That is, in-line pump 403 causes a pressure differential from the top of brewing chamber 404 to the bottom of brewing chamber 404 as well as over each of the grounds of coffee in coffee pod 410. While this is occurring, screen filter 406 prevents grounds in coffee pod 410 from expanding upwards as they bloom, maintaining the necessary constriction against the flow of water.

Brewed coffee passes from brew chamber 404 through intake valve 407 and back into liquid container 401, via return line 411, where it mixes with the rest of the liquid in liquid container 401, if any.

In one embodiment, the brewing cycle is repeated from that point where in-line pump 403 forces water from liquid container 401 through brew chamber 404 and the coffee grounds contained therein, and may continue, as long as in-line pump 403 is running. The cycles may continue until a desired brew is achieved.

More particularly, in one embodiment, when repeating the brewing cycle (e.g., turning on in-line pump 403), recirculation occurs in that the beverage that has been produced as a result of the brewing process is fed back into brew chamber 404 to undergo the brewing process and infusion again. In other words, the brewing process uses water during a first brewing cycle to produce an infused beverage, such as coffee, and the infused beverage produced by the first brewing cycle is used as at least part of the input into the next brewing cycle. This process may be repeated for one or more additional brewing cycles, using the resulting infused beverage output from the previous brewing cycle as at least part of an input for the next brewing cycle. In the case of coffee, these subsequent, or repeated, brewing cycles are performed using the same coffee grounds that were used at the beginning of the brewing process during the first brewing cycle of the brewing process. The cycling creates a continuous extraction process that controls the extraction level that can be achieved. Note that in one embodiment, it is desirable to use the least infused liquid in the subsequent brewing cycles to enhance the extraction process.

Thus, using multiple brewing cycles enhances the control of the water interaction or infusion with the coffee grinds. By using multiple brewing cycles and a cold brew process, there is more granular control over the strength and extraction of the brew than the prior art heated coffee brewing process. In one embodiment, the first cycle or pass is the one in which the most infusion between the coffee grinds and the brewing liquid (e.g., 70%), and each subsequent pass extracts less and less from the coffee grinds.

In one embodiment, the brewing process performs three brewing cycles (i.e., turning on in-line pump 403 three times) with the second and third cycles using coffee brewed in the preceding brewing cycle as an input into the next brewing cycle. The coffee brewed in the preceding brewing cycle may only represent a portion of the liquid is this input into the brewing chamber for the next brewing cycle (i.e., the liquid input into the brewing chamber for the next brewing cycle is a combination of the liquid that in in liquid container 401 feeding brew chamber 404, which may be water, and the coffee from produced during the last brewing cycle or previous brewing cycles. In another embodiment, the brewing process performs four brewing cycles (i.e., turning on in-line pump 403 four times) with the second, third, and fourth times using coffee brewed in the preceding brewing cycle as an input into the next brewing cycle. Note that the brewing process is not limited to performing three or four brewing cycles, and in other embodiments, the brewing process includes two brewing cycles or more than four brewing cycles.

Note that, in one embodiment, in-line pump 403 runs continuously during a brew process. For longer brew processes, in-line pump 403 runs on a throttled frequency to prevent overheating, but it never starts and stops outside of the beginning and commencement of the brewing process, which is a continuous re-circulation loop that is infinitely granular and can stop at any point.

In one embodiment, after each brewing cycle, a user can taste the brewed coffee and determine whether to run another brewing cycle. Thus, the ability to have multiple brewing cycles provides control for customization while in flight with the brewing process.

In one embodiment, liquid container 401 is transparent to allow the color of the coffee to been seen. In an alternative embodiment, an optical sensor is included in the brewing device to provide visual feedback as the coffee being produced.

In one embodiment, the coffee grounds in pod 410 (or other container) include multiple sets of coffee grounds, with each set having a different size and shape. This allows for manipulating the flow rate and extraction efficiency when making the beverage with brewing device 400. For example, in one embodiment, the coffee grounds include two sets of grounds with different sizes and shapes. In such a case, the set with the smaller coffee grounds provides most of the extraction during the first brewing cycle, while the set with the bigger coffee grounds provides most of the extraction for the second and subsequent brewing cycles. While this example involves two sets different sized coffee grounds, in another embodiment, there are three or more sets of coffee grounds that have different sizes and shapes.

In one embodiment, the brew process is a temperature agnostic infusion brewing process. That is, the brewing process is performed independent of temperature and is temperature agnostic in that regardless of the temperature of the water that is used at the start of the brewing process, the brewing process may be controlled to obtain coffee that has the desired characteristics (e.g., the resulting coffee meets a desired profile). In one embodiment, the brewing process is a "cold" brew coffee that infuses water with coffee flavor at room temperature. The term "cold brew" for purposes herein refers to brewing coffee using water at a temperature that has not been heated. In one embodiment, such water is at room temperature. In another embodiment, the water is taken from a tap but is not heated in the brewing device. In other words, the temperature of the water that is to be infused with coffee flavor is not manipulated or controlled during the brewing process.

In one embodiment, the cycle time used for brewing is dependent on the initial temperature of the water, where the cycle time refers to the time in-line pump 403 is on. For example, if the room temperature water is hotter because the environment is hotter or the water is received from a tap at a higher temperature than normal or room temperature, the brewing process may use a shorter cycle time (i.e., in-line pump 403 is on for a short period of time) than if the temperature of the water was at normal or room temperature. In one embodiment, a temperature sensor such as described above provides the temperature of the liquid in liquid container 401 and controller 420 control the cycle time based on temperature provided by the temperature sensor.

In one embodiment, the temperature of the water used for the first brewing cycle is heated to a predetermined temperature (e.g., 50° C., etc.). In one embodiment, the heating of the water is performed by a heater (not shown) in or near chamber 401 that holds the water. In one embodiment, such heating is performed by an induction heater (e.g., an induction coil, etc.).

In one embodiment, the flow rate through the brewing cycle is controlled by controller 420. In one embodiment, controller 420 controls the flow rate using in-line pump 403. More specifically, liquid is pumped by in-line pump 403 to brewing chamber 404 during the brewing process under control of controller 420 to control the extraction process. For example, by the amount of time in-line pump 403 is on, the pressure differential caused by the liquid entering brewing chamber 404 can be changed, thereby causing different extraction levels.

Note that there are other parameters that may be controlled in the brewing process to obtain the desired infusion besides those described above.

In one embodiment, the brewing process is digitally controlled. In one embodiment, the digital control is through the software application executing on mobile device 440. In one embodiment, the software application that is executing on mobile device 440 takes a user through an on-boarding flow with brewing device 401 when first being used. The application provides an explanation on how to use the device through graphical user interface 440A, including such steps as loading a coffee pod into the brewing device and adding water to the chamber. The user is instructed to run the brewing device for one cycle and then taste the resulting coffee. The user enters feedback into the application regarding the taste of the coffee through GUI 440A. The application may instruct the user to run one or more additional brewing cycles and records their feedback regarding the coffee that is produced. Based on the user feedback, the application is able to create a taste profile for the user. Once a taste profile for the user has been set up, the brewing process can be biased to create all subsequent brewed beverages according to, and in-line with, the taste profile.

Figure 5:
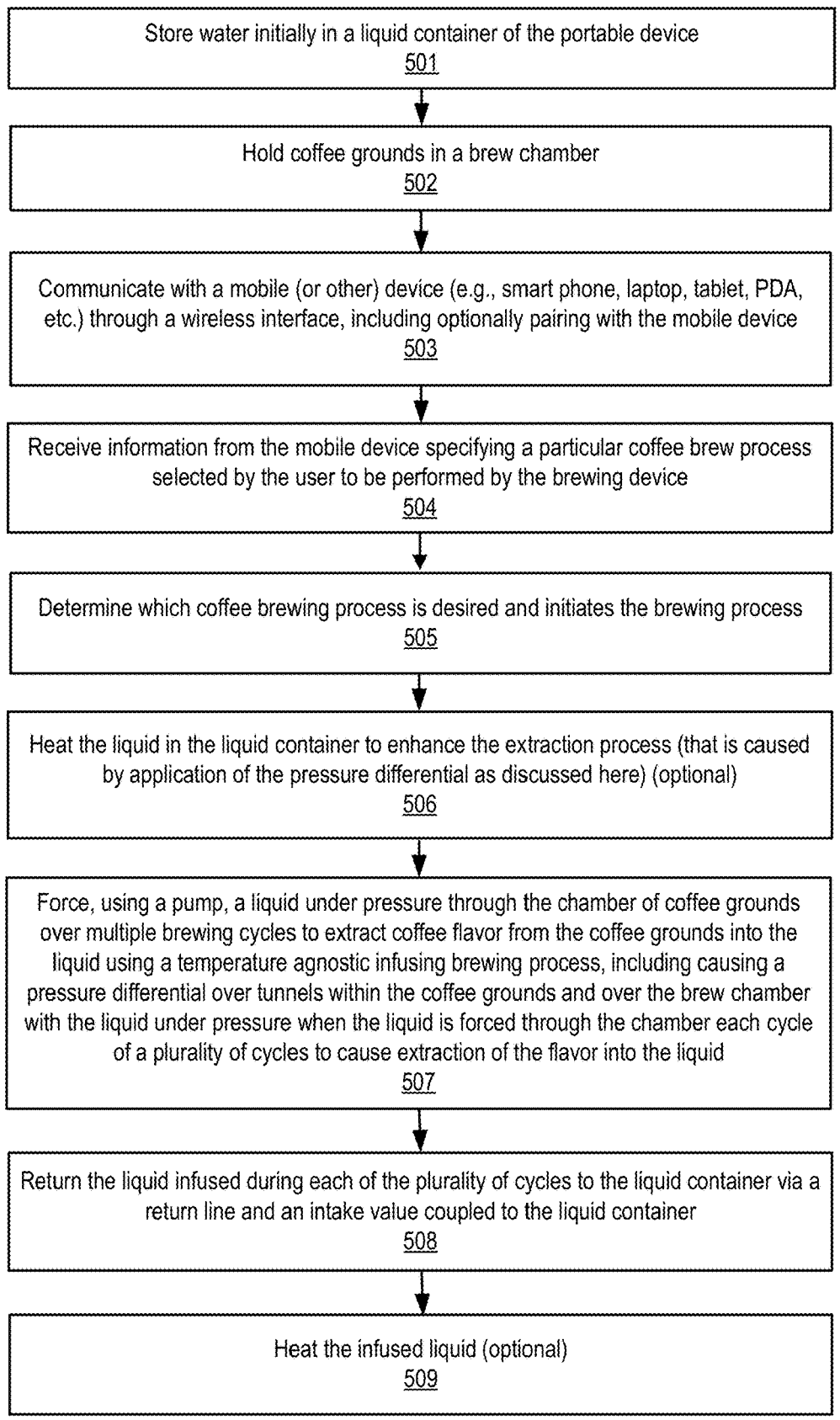
FIG. 5 is a flow diagram of another embodiment of an infusing process.

FIG. 5 is a flow diagram of one embodiment of a brewing process for brewing coffee using a portable device. In one embodiment, the process is by a brewing device, such as, for example, but not limited to, the brewing device of FIG. 4.

Referring to FIG. 5, the process begins by storing water initially in a liquid container of the portable device (processing block 501) and holding coffee grounds in a brew chamber (processing block 502). In one embodiment, the coffee grounds are in a pod or other enclosure that is put into the brewing chamber by a user.

Next, the brewing device communicates with a mobile (or other) device (e.g., smart phone, laptop, tablet, PDA, etc.) through a wireless interface, including optionally pairing with the mobile device (processing block 503). Note that the initially communication between the brewing device and the mobile device may occur prior to placing water into the liquid container and/or putting coffee grounds into the brewing chamber.

Once in communication with the mobile device, the brewing device receives information from the mobile device specifying a particular coffee brew process selected by the user to be performed by the brewing device (processing block 504). In one embodiment, the user selects the desired coffee brew process using a GUI (e.g., GUI 420A of FIG. 4) on the mobile device (e.g., mobile device 420 of FIG. 4).

In response to receiving the particular coffee brew process, the brewing device determines which coffee brewing process is desired and initiates the brewing process (processing block 505). In one embodiment, a controller (e.g., controller 420 of FIG. 4) in the brewing device receives the information specifying a particular coffee brew process and determines the necessary operations (e.g., brew length, duty cycle, number of cycles, etc.) associated with the specified coffee brew process and controls the brewing device to perform the process.

In one embodiment, the process includes heating the liquid in the liquid container to enhance the extraction process (that is caused by application of the pressure differential as discussed here) (processing block 506).

With water in the liquid container and coffee grounds in the brew chamber, the process forces, using a pump, a liquid under pressure through the chamber of coffee grounds over multiple brewing cycles to extract coffee flavor from the coffee grounds into the liquid using a temperature agnostic infusing brewing process, including causing a pressure differential over tunnels within the coffee grounds and over the brew chamber with the liquid under pressure when the liquid is forced through the chamber each cycle of a plurality of cycles to cause extraction of the flavor into the liquid (processing block 507). In one embodiment, the pump pulls water through the brew chamber to cause extraction of the flavor into the water each cycle. In another embodiment, the pump pushes water through the brew chamber to cause extraction of the flavor into the liquid each cycle. In one embodiment, the process includes powering the pump using a portable power source (e.g., a rechargeable battery). In one embodiment, the extraction is performed without the need for heat. In one embodiment, the extraction occurs in a vacuum.

In one embodiment, forcing water under pressure through the chamber of coffee grounds over multiple brewing cycles continuously operating the pump during the brew process. In one embodiment, each cycle of the plurality of cycles corresponds to a cycle time during which the pump is turned on to force the liquid through the coffee grounds. In one embodiment, the cycle time is dependent on temperature of the liquid immediately prior to running the temperature agnostic infusing brewing process. In one embodiment, the plurality of cycles includes three cycles.

In one embodiment, the process includes returning the liquid infused during each of the plurality of cycles to the liquid container via a return line and an intake valve coupled to the liquid container (processing block 508). In one embodiment, the pump is in line between the brew chamber and the return line.

At the point that the brew process has finished, in one embodiment, the infused liquid may be heated (processing block 509). In one embodiment, this heating occurs to bring the infused liquid to a desired, preferred, or better drinking temperature.

Figure 6:
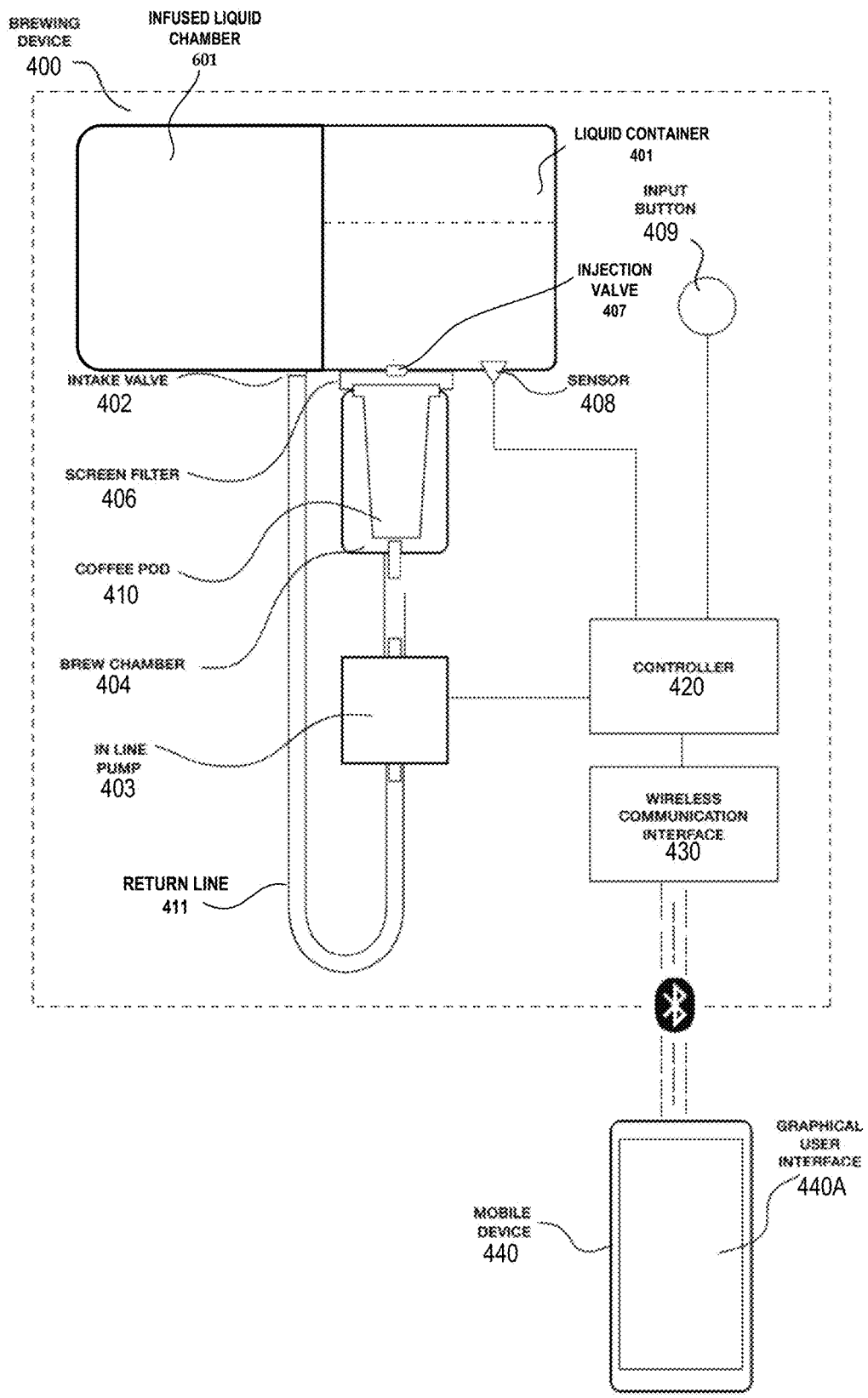
FIG. 6 is a block diagram of yet another embodiment of an infusing device.

FIG. 6 is a block diagram of yet another embodiment of an infusing device. In this case, the process of infusion a liquid operates as the process described and above in conjunction with FIGS. 4-5 except the infused liquid that is produced is output into an infused liquid chamber 601 from where it may be consumed or otherwise output and thus is not returned for liquid container 401. Therefore, the infusing apparatus of FIG. 6 does not use recirculation as part of the infusing process.

An Alternative Embodiment of an Infusion Device

Figure 7:
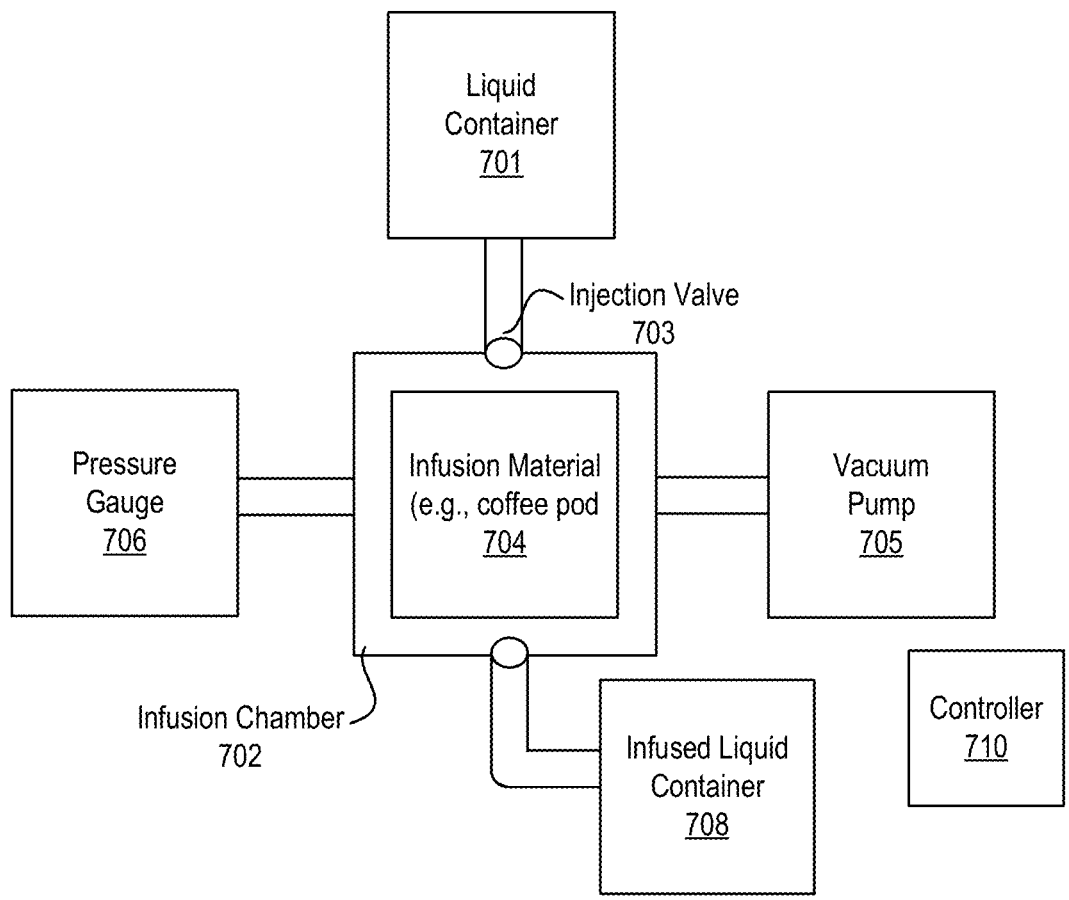
FIG. 7 is a block diagram of an embodiment of an infusing device that infuses a liquid via a pressure differential created by swinging liquid with an infusing material between two pressures (e.g., atmospheric pressure and vacuum pressure).

FIG. 7 is a block diagram of an embodiment of an infusing device that infuses a liquid via a pressure differential created by swinging liquid with an infusing material between two pressures (e.g., atmospheric pressure and vacuum pressure) one or more times. That is, in contrast to other infusing devices described above, the infusion device of FIG. 7 does not create a pressure differential by forcing a liquid through an infusing material using a pump.

Referring to FIG. 7, liquid that is to be infused (e.g., water, oil, etc.) in stored in liquid container 701 and is injected into infusion chamber 702 via injection value 703. Infusion chamber 702 includes an infusion material 704 such as described above (e.g., coffee, tea, non-plant material, etc.). In one embodiment, infusion material 704 is contained within packaging (e.g., a pod). In another embodiment, infusion material 704 is contained within an infuser (e.g., tea leaf infuser) or other mesh-like holder. A vacuum pump 705 is coupled to infusion chamber 702 to create a vacuum in infusion chamber 702.

The infusion process is controlled by controller 710. In one embodiment, controller 710 causes vacuum pump 705 to repeated put infusion chamber 702 under a vacuum so that infusion material 704 and the liquid to be infused in infusion chamber 702 swing between atmospheric pressure and vacuum pressure one or more times. In one embodiment, controller 710 causes the swing of pressure between atmospheric pressure and vacuum pressure in infusion chamber 702 multiple times according to a recipe to cause infusion of the liquid from infusion material 704 to a desired amount. After infusion, the infused liquid is exhausted through exhaust value to infused liquid container 708 from which the liquid may be consumed.

Figure 8:
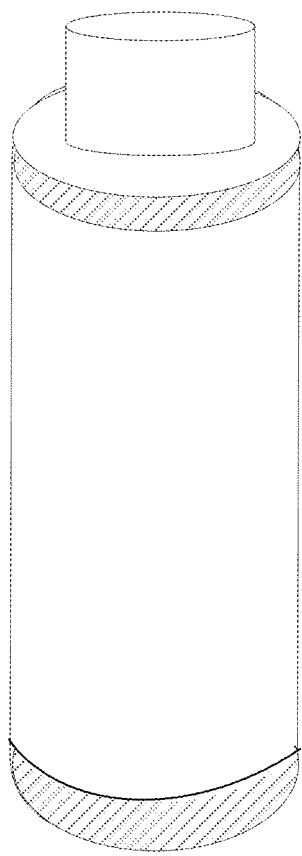
FIG. 8 is an example of a flask that includes the infusing apparatuses disclosed herein.

Note that the infusing apparatuses described herein may be incorporated into a flask or other portable drinking apparatus so that the infusion process and process of consuming or otherwise outputting of an infused liquid occurs with a portable or mobile device. FIG. 8 is an example of such a flask. Note that the techniques disclosed herein are not limited to use with the flask of FIG. 8 and may be used with flasks of all shapes and sizes.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A coffee brewing device comprising:
    a liquid container to store the liquid, the liquid container having an intake valve;
    a brew chamber to hold a packed chamber of coffee grounds; and
    a pump to force a liquid under pressure through the packed chamber of coffee grounds over one or more brewing cycles to extract coffee flavor from the coffee grounds into the liquid using a temperature agnostic infusing brewing process, the liquid under pressure causing a pressure differential over tunnels within the coffee grounds and over the brew chamber when forced through the chamber the one or more brewing cycles to cause extraction of the flavor into the liquid, and
    a return line, coupled to the intake valve, to recirculate coffee flavor-infused liquid back into the brewing chamber, via the liquid container, upon performing one or more additional brewing cycles after a first of the one or more brewing cycles when performing multiple brewing cycles.

2. The coffee brewing device of claim 1 wherein the pump is operating continuously during each of the one or more brewing cycles.

3. The coffee brewing device of claim 1 wherein the pump is configured to force the liquid under pressure through the packed chamber of coffee grounds over the multiple brewing cycles with the liquid under pressure causing a pressure differential over tunnels within the coffee grounds and over the brew chamber when forced through the chamber each cycle of the one or more brewing cycles to cause extraction of the flavor into the liquid, and each cycle of the one or more brewing cycles corresponds to a cycle time during which the pump is turned on to force the liquid through the coffee grounds.

4. The coffee brewing device of claim 3 wherein the cycle time is dependent on temperature of the liquid immediately prior to running the temperature agnostic infusing brewing process.

5. The coffee brewing device of claim 3 wherein the plurality of cycles includes three cycles.

6. The coffee brewing device of claim 1 wherein the pump is an in-line pump between the brew chamber and the return line.

7. The coffee brewing device of claim 1 further comprising:
    a temperature sensor to monitor temperature of the liquid in the liquid container.

8. The coffee brewing device of claim 1 further comprising a controller to control the brewing process.

9. The coffee brewing device of claim 8 wherein the controller is configured to control flow rate of the pump.

10. The coffee brewing device of claim 9 further comprising:
    a wireless communication interface coupled to the controller to perform wireless communication with a mobile device external to the coffee brewing device.

11. The coffee brewing device of claim 10 wherein the wireless communication comprises short-range wireless communication.

12. The coffee brewing device of claim 10 wherein the wireless communication interface is configured to receive brewing cycle information for use by the controller to control the brew cycle.

13. The coffee brewing device of claim 12 wherein the brew cycle information is received by the wireless communication interface in response to selection by a user of a brew type from a graphical user interface on the mobile device.

14. The coffee brewing device of claim 1 wherein the packed coffee grounds comprise a plurality of sets of coffee grounds, wherein each set of the plurality of sets of coffee grounds are different from each other.

15. A coffee brewing device comprising:
    a liquid container to store the liquid, the liquid container having an intake valve;

a brew chamber to hold a packed chamber of coffee grounds; and a pump to force a liquid under pressure through the packed chamber of coffee grounds over one or more brewing cycles to extract coffee flavor from the coffee grounds into the liquid using a temperature agnostic infusing brewing process, the liquid under pressure causing a pressure differential over tunnels within the coffee grounds and over the brew chamber when forced through the chamber the one or more brewing cycles to cause extraction of the flavor into the liquid, wherein the pump is configured to force the liquid under pressure through the packed chamber of coffee grounds over he multiple brewing cycles with the liquid under pressure causing a pressure differential over tunnels within the coffee grounds and over the brew chamber when forced through the chamber each cycle of the one or more brewing cycles to cause extraction of the flavor into the liquid, and each cycle of the one or more brewing cycles corresponds to a cycle time during which the pump is turned on to force the liquid through the coffee grounds, and a return line, coupled to the intake value, to recirculate coffee flavor-infused liquid back into the brewing chamber, via the liquid container, upon performing one or more additional brewing cycles after a first of the one or more brewing cycles when performing the multiple brewing cycles, wherein the pump is an in-line pump between the brew chamber and the return line.

16. The coffee brewing device of claim 15 wherein the cycle time is dependent on temperature of the liquid immediately prior to running the temperature agnostic infusing brewing process.

17. The coffee brewing device of claim 15 further comprising:

a temperature sensor to monitor temperature of the liquid in the liquid container, a controller to control the brewing process, including the flow rate of the pump.

18. The coffee brewing device of claim 15 further comprising:

a wireless communication interface coupled to the controller to perform wireless communication with a mobile device external to the coffee brewing device, wherein the wireless communication comprises short-range wireless communication and is configured to receive brewing cycle information for use by the controller to control the brew cycle in response to selection by a user of a brew type from a graphical user interface on the mobile device.

* * * * *